(12) United States Patent
Meng

(10) Patent No.: US 11,408,411 B2
(45) Date of Patent: Aug. 9, 2022

(54) AIR-CONDITIONING UNIT, COMPRESSOR AND HOUSING STRUCTURE THEREOF

(71) Applicants: GREE ELECTRIC APPLIANCES (WUHAN) CO., LTD, Hubei (CN); GREE ELECTRIC APPLIANCES, INC. OF ZHUHAI, Guangdong (CN)

(72) Inventor: Qiangjun Meng, Guangdong (CN)

(73) Assignees: Gree Electric Appliances (Wuhan) Co., Ltd, Hubei (CN); Gree Electric Appliances, Inc. of Zhuhai, Guangdong (CN)

( * ) Notice: Subject to any disclaimer, the term of this patent is extended or adjusted under 35 U.S.C. 154(b) by 15 days.

(21) Appl. No.: 16/620,312

(22) PCT Filed: Dec. 22, 2017

(86) PCT No.: PCT/CN2017/118104
§ 371 (c)(1),
(2) Date: Dec. 6, 2019

(87) PCT Pub. No.: WO2018/223665
PCT Pub. Date: Dec. 13, 2018

(65) Prior Publication Data
US 2021/0079906 A1    Mar. 18, 2021

(30) Foreign Application Priority Data
Jun. 6, 2017 (CN) .......................... 201710418138.7

(51) Int. Cl.
*F04B 39/00* (2006.01)
*F04C 29/00* (2006.01)
(Continued)

(52) U.S. Cl.
CPC .......... *F04B 39/0044* (2013.01); *F04C 29/00* (2013.01); *H02K 5/24* (2013.01);
(Continued)

(58) Field of Classification Search
CPC ........ F04B 39/0044; H02K 5/24; H02K 5/26; H02K 5/12; H02K 5/132; H02K 5/08;
(Continued)

(56) References Cited

U.S. PATENT DOCUMENTS 1,614,190 A * 1/1927 Dyer ..................... F04D 29/646
                                                          29/889.3
2,030,565 A * 2/1936 Bilde ........................ A47L 9/22
                                                          15/300.1
(Continued)

FOREIGN PATENT DOCUMENTS

CN        102278308 A       12/2011
CN        104048367 A        9/2014
(Continued)

OTHER PUBLICATIONS

Extended European Search Report for European Application No. 17912883.0 dated Mar. 23, 2020 (8 pages).

*Primary Examiner* — Kenneth J Hansen
(74) *Attorney, Agent, or Firm* — Brandon V. Zuniga; James R. Gourley; Carstens & Cahoon, LLP

(57) ABSTRACT

A housing structure including: a housing, a bottom of the housing being provided with a plurality of supporting feet; a supporting component disposed in the housing and configured to support a motor and a rotor of a compressor; and a connecting component, one end of the connecting component being connected to the supporting component, another end of the connecting component being connected to the housing, and a joint of the connecting component with the housing being away from the supporting feet. An air-conditioning unit and a compressor thereof are also provided.

10 Claims, 1 Drawing Sheet

(51) Int. Cl.
*H02K 5/24* (2006.01)
*F04C 23/02* (2006.01)
*H02K 5/00* (2006.01)

(52) U.S. Cl.
CPC .......... *F04C 23/02* (2013.01); *F04C 2240/30* (2013.01); *F04C 2240/40* (2013.01); *F04C 2270/12* (2013.01); *H02K 5/00* (2013.01)

(58) Field of Classification Search
CPC ........ H02K 5/1285; H02K 5/00; F04C 29/00; F04C 23/02; F04C 2240/30; F04C 2240/40; F04C 2270/12; F01D 25/28; F16M 11/10; F16M 7/00; F16M 9/00; F16M 1/04; F16M 13/00
USPC .......................................... 248/672, 673, 678
See application file for complete search history.

(56) References Cited

U.S. PATENT DOCUMENTS

| | | | |
|---|---|---|---|
| 2,741,425 A | 4/1956 | Scheldorf | |
| 2,928,589 A | 3/1960 | Davey | |
| 3,807,907 A * | 4/1974 | Gannaway | F04B 39/1066 417/415 |
| 3,887,304 A | 6/1975 | Otaki | |
| 4,108,581 A | 8/1978 | Miller et al. | |
| 4,360,087 A * | 11/1982 | Curwen | F04B 39/0044 188/379 |
| 4,482,124 A * | 11/1984 | Dochterman | F16F 15/00 248/672 |
| 5,293,664 A | 3/1994 | Lim et al. | |
| 8,459,963 B2 * | 6/2013 | Pileski | F04C 18/16 417/312 |
| 2014/0110892 A1 * | 4/2014 | Wojcieson | F04D 29/668 267/136 |
| 2016/0222829 A1 * | 8/2016 | Hulfenhaus | F01D 25/285 |

FOREIGN PATENT DOCUMENTS

| | | |
|---|---|---|
| CN | 104141608 A | 11/2014 |
| CN | 204692091 U | 10/2015 |
| CN | 205173356 U | 4/2016 |
| CN | 105604947 A | 5/2016 |
| CN | 205876656 U | 1/2017 |
| CN | 206111470 U | 4/2017 |
| CN | 206158947 U | 5/2017 |
| CN | 107044421 A | 8/2017 |
| CN | 206874488 U | 1/2018 |
| GB | 1513478 A | 6/1978 |
| JP | 2011094569 A | 5/2011 |
| KR | 20070070627 A | 7/2007 |
| WO | 0070223 A1 | 11/2000 |

* cited by examiner

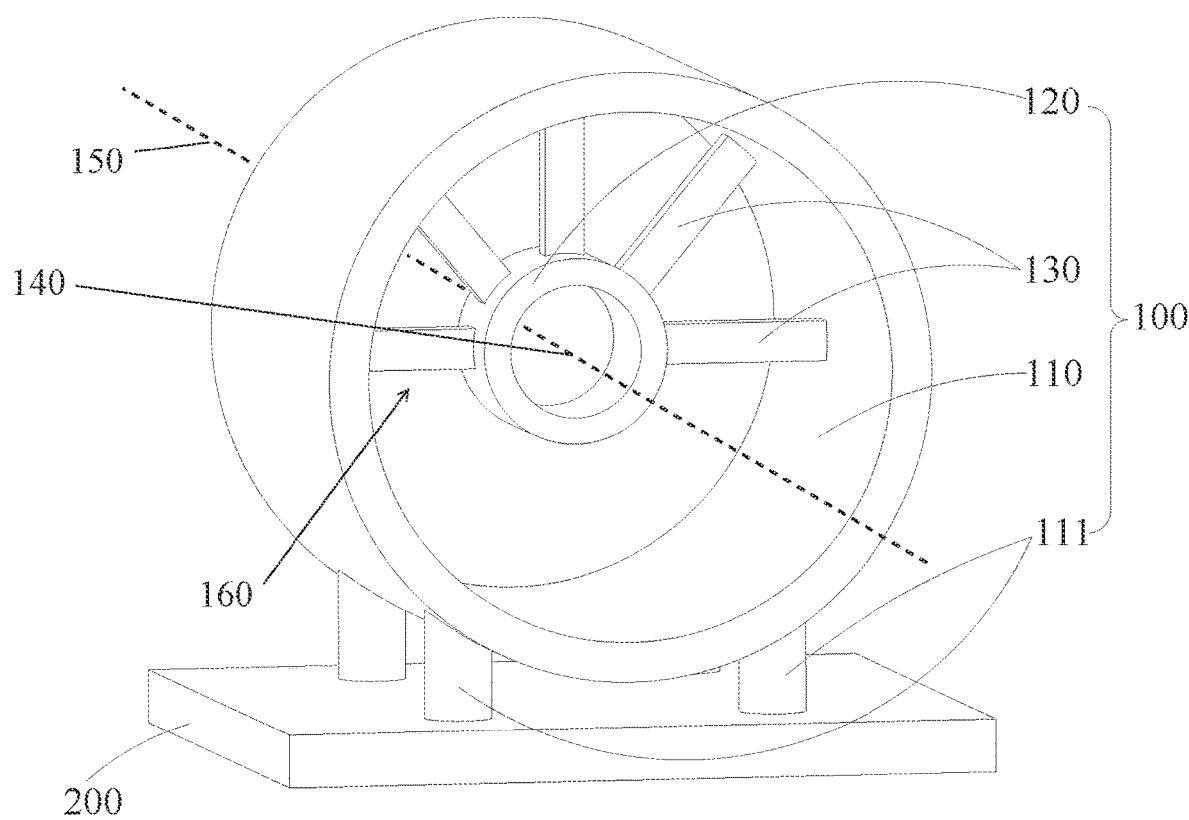

AIR-CONDITIONING UNIT, COMPRESSOR AND HOUSING STRUCTURE THEREOF

CROSS REFERENCE TO RELATED APPLICATION

This application is a US 371 application from PCT/CN2017/118104 filed Dec. 22, 2017, published as WO 2018/223665 on Dec. 13, 2018, which claims priority to Chinese Patent Application No. 201710418138.7, filed on Jun. 6, 2017, entitled "Air-Conditioning Unit, Compressor and Housing Structure Thereof", the entire contents of which are incorporated herein by reference.

TECHNICAL FIELD

The present disclosure relates to the technical field of an air-conditioning device, and particularly to an air-conditioning unit, a compressor and a housing structure thereof.

BACKGROUND

The working principle of the compressor is that the rotation of the motor drives the rotor to rotate and compress the refrigerant, but the dynamical system of the compressor will inevitably bring noise and vibrations. Therefore, shock absorption and noise reduction have become necessary factors considered in developing various products. Generally, the strength, the amount of deformation and the uniformity of the structural member around the vibration source are considered in developing a compressor; supporting ribs can be evenly distributed on the structural members around the source, such that on the transmission path of the vibration, part of the supporting ribs can directly transmit the vibration to the feet. At this time, the vibration value of the compressor tends to be greater, and the vibration can be transmitted to the whole machine when the compressor operates, which increases the vibration value of the whole machine and affects the operation reliability of the whole machine.

SUMMARY

In view of this, as for the problem of excessive compressor vibration value caused by the current supporting rib transmitting vibration to the supporting feet directly, it is necessary to provide a housing structure capable of extending the transmission path of the vibration and reducing the vibration output, and also provide a compressor including the above-mentioned housing structure, and an air-conditioning unit including the above-mentioned compressor.

The above objectives are implemented by the following technical solutions.

A housing structure includes:

a housing, a bottom of the housing being provided with a plurality of supporting feet;

a supporting component disposed in the housing and configured to support a motor and a rotor of a compressor; and a connecting component, one end of the connecting component being connected to the supporting component, another end of the connecting component being connected to the housing, and a joint of the connecting component and the housing being away from the supporting feet.

In an embodiment, the joint of the connecting component and the housing is located above the supporting feet.

In an embodiment, a projection of the joint of the connecting component and the housing, which is projected on a vertical plane, is above a projection of a center of the housing on the vertical plane.

In an embodiment, the connecting component is in a shape of a straight line, a curve, or a straight line combined with a curve.

In an embodiment, the connecting component comprises a surrounding portion and connecting portions disposed at both ends of the surrounding portion; both ends of the connecting component are respectively connected to the supporting component and the housing through the connecting portions; and at least partial surrounding portion surrounds the supporting component.

In an embodiment, a number of the connecting component is multiple, the joint of each of multiple connecting components and the housing is distributed in a circumferential direction of the housing; and the connecting components are not in contact with each other.

In an embodiment, the multiple connecting components are radially disposed, and the multiple connecting components are evenly distributed in a circumferential direction of the housing.

In an embodiment, a central angle, formed by a joint of the connecting component and the housing adjacent to the supporting feet and a point of the supporting feet and the housing, is ranged from 50° to 150°.

A compressor includes a motor, a rotor and the housing structure of any one of the above embodiments;

an output end of the motor is connected to the rotor; both the motor and the rotor are mounted in the housing of the housing structure; and a supporting component of the housing structure is configured to support a joint of the motor and the rotor.

An air-conditioning unit includes the above-mentioned compressor.

By adopting the above technical solutions, the advantages of the present disclosure are provided as follows.

As for the air-conditioning unit, the compressor and the housing structure thereof in the present disclosure, the supporting component is connected to the housing through the connecting component to transmit the vibration in the supporting component to the supporting feet through the housing. Moreover, the joint of the connecting component and the housing is away from the supporting feet, which increases the transmission distance from the supporting component to the supporting feet. In this way, the vibration needs to pass through a transmission path in the housing before reaching the supporting feet, which effectively solves the problem of excessive compressor vibration value caused by the current supporting rib transmitting vibration to the supporting feet directly, and extends the transmission path of the vibration in the housing, thereby reducing the final vibration output of the compressor, reducing the value of the vibration transmitted to the whole machine of the air-conditioning unit during the operation, finally reducing the vibration value of the whole machine of the air-conditioning unit and ensuring the operational reliability of the whole machine.

BRIEF DESCRIPTION OF DRAWINGS

FIG. 1 is a schematic structure diagram of a housing structure according to an embodiment of the present disclosure.

The following elements are illustrated in FIG. 1:
100, housing structure;
110, housing;
111, supporting foot;
120, supporting component;
130, connecting component;
140, center point of the housing;
150, central axis of the housing;
160, surrounding portion formed from a plurality of connecting components; and
200, parts-mounting portion.

DETAILED DESCRIPTION OF DISCLOSED EMBODIMENTS

In order to make the objectives, technical solutions and advantages of the present disclosure clearer, the air-conditioning unit, the compressor and the housing structure thereof in the present disclosure will be further described in detail below through embodiments with reference to accompanying drawings. It should be understood that the specific embodiments described herein are merely illustrations of the present disclosure and are not intended to limit the present disclosure.

Referring to FIG. 1, FIG. 1 is a schematic structure diagram of a housing structure 100 according to an embodiment of the present disclosure. The present disclosure provides a housing structure 100 disposed in a compressor and configured to reduce vibrations during operation of the compressor. In the embodiment of the present disclosure, the compressor refers to a screw compressor. Of course, the housing structure 100 of the present disclosure can also serve as a housing of any other device requiring a shock absorption. The housing structure 100 of the present disclosure can effectively solve the problem of excessive compressor vibration value caused by the current supporting rib transmitting vibration to the supporting feet 111 directly, and extends the transmission path of the vibration, thereby reducing the final vibration output of the compressor, reducing the value of the vibration transmitted to the whole machine of the air-conditioning unit during the operation, finally reducing the vibration value of the whole machine of the air-conditioning unit and ensuring the reliability of the operation of the whole machine.

In the present disclosure, the housing structure 100 includes a housing 110, a supporting component 120, and a connecting component 130. The housing 110 is configured to receive various parts and components of the compressor are disposed in the housing 110 to ensure normal operation of the compressor, and moreover, to provide protection and reduce noise. The supporting component 120 is configured to support the motor and the rotor of the compressor. The output end of the motor of the compressor is connected to the rotor. When the motor drives the rotor to rotate, vibrations are generated in both the motor and the rotor. The motor and the rotor are supported by the supporting component 120, which enables the vibration of the motor and the rotor generated during the operation of the compressor to be reduced, thereby ensuring the operational performance of the compressor and improving the reliability of the operation of the compressor. Furthermore, the cross-section of the supporting component 120 has a closed shape, in this way, the reliability of the supporting component 120 can be ensured. Preferably, the supporting component 120 is a supporting ring. The connecting component 130 is configured to connect the housing 110 with the supporting component 120, to ensure that the supporting component 120 is reliably fixed in the housing 110. Moreover, the connecting component 130 can transmit the vibration in the supporting component 120 to the housing 110, and then transmits the vibration to the supporting feet 111 through the housing 110, thereby reducing the vibration of the supporting component 120 and ensuring the motor and the rotor to operate smoothly.

The housing 110 is provided with a bracket. The compressor is mounted on a mounting surface of the parts-mounting portion 200 through the supporting feet 111 on the housing 110 to ensure a fixed position of the housing 110, which enables the vibration in the housing 110 to be transmitted to the parts-mounting portion 200 through the supporting feet 111. Moreover, the joint of the connecting component 130 and the housing 110 is away from the supporting feet 111, that is, there is a certain distance from the joint of the connecting component 130 and the housing 110 to the joint of the supporting feet 111 and the housing 110 in the circumferential direction of the housing 110. After the vibration in the supporting component 120 is transmitted to the housing 110 through the connecting component 130, the vibration moves along the housing 110 for a certain distance before being transmitted to the supporting feet 111. In this way, the vibration is attenuated in the process of the transmission, through extending the transmission path on which the vibration is transmitted to the housing 110 through the connecting component 130 and finally to the supporting feet 111 as far as possible, the actual transmission path of the vibration is increased, and the attenuation of the vibration on the housing 110 is intensified, thereby reducing the value of the vibration of the compressor during operation, and further reducing the value of the vibration finally transmitted to the parts-mounting portion 200 by the compressor, reducing the vibration of the whole machine of the air-conditioning unit and improving the operational reliability.

The housing structure 100 of the compressor of the present disclosure improves the transmission path of the vibration on the housing 110 and extends the transmission path, such that the vibration is transmitted to the housing 110 through the connecting component 130 first, and then is transmitted to the supporting feet 111 through the housing 110. The transmission path between the housing 110 and the supporting feet 111 can attenuate the vibration and reduce the value of the vibration transmitted to the supporting feet 111, thereby reducing the value of the vibration transmitted to the parts-supporting portion by the compressor during operation, reducing the vibration value of the whole machine of the air-conditioning unit and ensuring stable and reliable operation of the compressor.

As an embodiment, the joint of the connecting component 130 and the housing 110 is located above the supporting feet 111. Generally, the supporting feet 111 of the housing 110 of the compressor are disposed at the bottom of the housing 110 and configured to fix and support the housing, and moreover, the supporting feet can facilitate fixing the housing 110 and the compressor. The joint of the connecting component 130 and the housing 110 is located above the supporting feet 111, which ensures that there is a certain transmission path from the joint of the connecting component 130 and the housing 110 to the joint of the supporting feet 111 and the housing 110 in the circumferential direction of the housing 110, thereby achieving the purpose of attenuating the vibration in the housing 110, reducing the value of the vibration transmitted to the supporting feet 111, reducing the value of the vibration transmitted to the parts-supporting portion by the compressor during operation, and ensuring stable and reliable operation of the compressor. Of course, in other embodiments of the present disclosure, the joint of the connecting component 130 and the housing 110 can also be located below the joint of the supporting feet 111 and the housing 110. In this case, it is necessary to ensure a certain transmission path from the joint of the connecting component 130 and the housing 110 to the supporting feet 111, so that the vibration in the connecting component 130 is attenuated by the housing 110 before being transmitted to the supporting feet 111.

Furthermore, the projection of the joint of the connecting component 130 and the housing 110, which is projected on the vertical plane, is above the projection of the center of the housing 110 on the vertical plane. That is, the joint of the connecting component 130 and the housing 110 is located above the horizontal line passing through the center point of the housing 110, as shown in FIG. 1. In this way, it is ensured that there is a certain distance from the joint of the connecting component 130 and the housing 110 to the joint of the supporting feet 111 and the housing 110 in the circumferential direction of the housing 110, such that the vibration can be attenuated after being transmitted to the housing 110 through the connecting component 130, thereby reducing the value of the vibration transmitted to the supporting feet 111, reducing the value of the vibration transmitted to the parts-supporting portion by the compressor during operation, and ensuring stable and reliable operation of the compressor.

As an embodiment, the connecting component 130 is in a shape of a straight line, a curve, or a straight line combined with a curve. The shape of the connecting component 130 is not limited in principle, as long as it can ensure a reliable connection between the supporting component 120 and the housing 110. Based on this, in order to increase the vibration attenuation effect of the connecting member 130, the length of the connecting component 130 can be appropriately increased to increase the transmission path of the vibration. In the present embodiment, the connecting component 130 is a connecting rib. Of course, the connecting component 130 can also be any one of other parts capable of connecting the housing 110 with the supporting component 120. The connecting component 130 can be in a shape of a straight line, or can be formed by combining multiple straight-lined parts. The connecting component 130 can also be in a shape of a curve, or can be formed by combining multiple curved parts. Of course, the connecting component 130 can be in a shape of a straight line combined with a curve.

Furthermore, the shape of the cross-section of the connecting component 130 can be gradually changed in the length direction of the connecting component 130, i.e., an area of the cross-section can be gradually increased or decreased, which can facilitate transmitting the vibration, and furthermore, enables the vibration to be attenuated during the transmission of the vibration through the connecting component 130.

In the present embodiment, the connecting component 130 is provided and in a shape of a straight line, which can ensure a reliable connection of the supporting component 120 to the housing 110, and facilitate transmitting the vibration to the housing 110 through the connecting component 130. Of course, in other embodiments of the present disclosure, the connecting component 130 can also be arranged in such a way that at least partial connecting component surrounds the supporting component 120 while ensuring the reliable connection of the supporting component 120 to the housing 110. In this case, the connecting component 130 includes a surrounding portion, and connecting portions disposed at both ends of the surrounding portion. Both ends of the connecting component 130 are respectively connected to the supporting component 120 and the housing 110 through the connecting portions, and at least partial surrounding portion surrounds the supporting component 120. In this way, the length of the connecting component 130 is increased, thereby extending the transmission path of the vibration, intensifying the attenuation during the transmission of the vibration, reducing the value of the vibration transmitted to the supporting feet 111, reducing the value of the vibration transmitted to the parts-supporting portion by the compressor during operation, and ensuring stable and reliable operation of the compressor.

Furthermore, the number of the connecting members 130 is multiple, and the joint of each of multiple connecting components 130 and the housing 110 is distributed in the circumferential direction of the housing 110, and there are certain distances between the connecting components 130. That is, there are no contact portions between the connecting components 130. The projections in the front view direction and in the left view direction shown in FIG. 1 can overlap, as long as the connecting components 130 are not in contact with each other, thereby avoiding the problems during fixing the supporting component 120 caused by the interlaced vibration, and ensuring the reliable transmission of the vibration. The connecting components 130 can be arranged in a row in the axial direction of the housing 110 and distributed in the circumferential direction of the housing 110; the connecting components 130 can also be distributed in the circumferential direction and be offset in the axial direction of the housing 110; the connecting components 130 can also be offset, and the like.

In the present embodiment, the multiple connecting components 130 are radially disposed, and are evenly distributed in the circumferential direction of the housing 110, which can ensure uniform forces on the supporting component 120, ensure a reliable connection of the supporting component 120 and the outer casing 110, and meanwhile further ensures a certain distance from the joint of the connecting component 130 and housing 110 to the joint of the supporting feet 111 and the housing 110 in the circumferential direction of the housing 110, thereby facilitating the vibration transmission and the vibration attenuation. Of course, in other embodiments of the present disclosure, the multiple connecting components 130 can be unevenly distributed in the circumferential direction of the housing 110.

Furthermore, a central angle, formed by the joint of the connecting component 130 and the housing 110 adjacent to the supporting feet 111 and by the joint of the supporting feet 111 and the housing 110, is ranged from 50° to 150°. That is, there is a certain distance from the joint of the connecting component 130 and the housing 110 adjacent to the supporting feet 111 to the joint of the supporting feet 111 and the housing 110 in the circumferential direction of the housing 110, and there is definitely a certain distance from the joint of any other connecting component 130 and the housing 110 slightly away from the supporting feet 111 to the joint of the supporting feet 111 and the housing 110 in the circumferential direction of the housing 110. Accordingly, the transmission path of the vibration in the housing 110 is extended, thereby intensifying the attenuation during the vibration transmission, reducing the value of the vibration transmitted to the supporting feet 111, reducing the value of the vibration transmitted to the parts-supporting portion by the compressor during operation, and ensuring stable and reliable operation of the compressor.

It should be noted that the housing structure 100 of the present disclosure extends the transmission path of the vibration by arranging the joint of the connecting component 130 and the housing 110 above the supporting feet 111, to implement the attenuation of the vibration in the housing 110 and reduce the value of the vibration transmitted to the supporting feet 111. Meanwhile, it is also required to take into account the strength of the structure around the supporting component 120 (i.e., the source), the amount of deformation and uniformity, etc., to ensure the operational reliability and performance of the compressor, and at this time, executing the present application can start from strengthening the thickness of the structure around the source.

The present disclosure further provides a compressor including a motor, a rotor and the housing structure 100 described in the above embodiments. The output end of the motor is connected to the rotor, and both the motor and the rotor are mounted in a housing 110 of the housing structure 100. The supporting component 120 of the housing structure 100 is configured to support the joint of the motor and the rotor. In the compressor of the present disclosure, the supporting component 120 of the housing structure 100 supports the motor and the rotor; the connecting component 130 transmits the vibration generated by the motor and the rotor on the supporting component 120 to the housing 110; the vibration is attenuated by the housing 110 before being transmitted to the supporting feet 111 of the housing 110, thereby reducing the vibration value of the compressor during operation, reducing the value of the vibration transmitted to the supporting feet 111, and then reducing the value of the vibration finally transmitted to the parts-mounting portion 200 by the compressor, and improving the operational reliability of the compressor.

The present disclosure also provides an air-conditioning unit including the compressor of the above embodiment. The air-conditioning unit of the present disclosure implements the cooling and heating performances through the compressor, thereby reducing the vibration value of the air-conditioning unit during operation, and improving the operational reliability of the air-conditioning unit.

The technical features of the above-described embodiments can be arbitrarily combined. For the sake of brevity of description, not all possible combinations of the technical features in the above embodiments are described. However, as long as there is no contradiction between the combinations of these technical features, all should be considered as the scope of the description of the present specification.

The above-mentioned embodiments are merely illustrations of several embodiments of the present disclosure, and the description thereof is more specific and detailed, but is not intended to limit the scope of the present disclosure. It should be noted that a number of variations and modifications can be made by those skilled in the art without departing from the spirit of the present disclosure, and they are within the scope of the present disclosure. Therefore, the scope of the disclosure should be determined by the appended claims.

What is claimed is:

1. An apparatus comprising:
    a motor;
    a rotor of a compressor; and
    a housing structure, the housing structure comprising:
        a housing, a bottom of the housing being provided with a plurality of supporting feet;
        a supporting component disposed in the housing and configured to support the motor and the rotor of the compressor; and
        a plurality of connecting components, one end of each of the plurality of
        connecting components being connected to the supporting component, another end of each of the plurality of connecting components forming a joint by being connected to the housing, and each joint of each of the plurality of connecting components and the housing being away from the supporting feet;
        wherein, the joint of each of the plurality of connecting components and the housing is located above the plurality of supporting feet;
        wherein, as projected on a vertical plane: a projection of the joint of each of the plurality of connecting components and the housing is at least partially above a projection of a center point of the housing on the vertical plane, wherein the center point is in a central axis of the housing.

2. The apparatus according to claim 1, wherein, the plurality of connecting components form a surrounding portion, and connecting portions are disposed at both ends of each of the plurality of connecting components;
    both ends of each of the plurality of connecting components are respectively connected to the supporting component and the housing through the connecting portions;
    and the surrounding portion at least partially surrounds the supporting component.

3. The apparatus according to claim 1, wherein, the joints of the plurality of connecting components and the housing are distributed in a circumferential direction of the housing;
    and the plurality of connecting components are not in contact with each other.

4. The apparatus according to claim 3, wherein, the plurality of connecting components are radially disposed, and the plurality of connecting components are spaced from each other in the circumferential direction of the housing.

5. The apparatus according to claim 4, wherein, for each connecting component: a central angle is formed by projecting a first line and a second line on a plane that includes a point on the central axis and is perpendicular to the central axis; the first line extends between the point on the central axis of the housing and the joint of the respective connecting component and the housing; the second line extends between the point on the central axis of the housing and a point where one of the plurality of supporting feet intersects the housing, and the central angle ranges from 50° to 150°.

6. The apparatus according to claim 3, wherein, the plurality of connecting components extend in a radial direction of the housing and are distributed in the circumferential direction of the housing.

7. The apparatus according to claim 1, wherein, each of the plurality of connecting components is formed by combining multiple straight-lined parts.

8. The apparatus according to claim 1, wherein, the supporting component is a supporting ring.

9. The apparatus according to claim 1, wherein, a cross-section of the supporting component has a closed-ring shape.

10. The apparatus according to claim 1, wherein, a level of the joint of each of the plurality of connecting components and the housing is higher than a level of a joint of each of the supporting feet and the housing.

* * * * *